United States Patent [19]

Pullukat et al.

[11] Patent Number: 5,723,402
[45] Date of Patent: Mar. 3, 1998

[54] SILICAS WITH SPECIFIC CONTENTS OF CATIONS AS SUPPORTS FOR OLEFIN POLYMERIZATION CATALYSTS

[75] Inventors: Thomas J. Pullukat, Lansdale; Ronald S. Shinomoto, Schwenksville, both of Pa.; Carl A. Gillings, Wilmington, Del.

[73] Assignee: PQ Corporation, Valley Forge, Pa.

[21] Appl. No.: 655,178

[22] Filed: May 30, 1996

[51] Int. Cl.$^6$ ............................... B01J 21/08; B01J 21/14
[52] U.S. Cl. ..................... 502/232; 502/104; 502/113; 502/243; 502/250; 502/251
[58] Field of Search ..................... 502/232, 243, 502/250, 251, 104, 113

[56] References Cited

U.S. PATENT DOCUMENTS

| | | | |
|---|---|---|---|
| 3,453,077 | 7/1969 | Hyde | 23/182 |
| 3,784,539 | 1/1974 | Ort | 260/94.9 |
| 3,787,384 | 1/1974 | Stevens et al. | 260/94.9 |
| 3,960,826 | 6/1976 | Aboutboul et al. | 526/103 |
| 4,530,912 | 7/1985 | Pullukat et al. | 502/104 |
| 4,701,432 | 10/1987 | Welborn et al. | 502/113 |
| 4,791,089 | 12/1988 | Dombro et al. | 502/236 |
| 4,894,424 | 1/1990 | Lassalle | 526/125 |
| 5,057,475 | 10/1991 | Canick et al. | 502/104 |
| 5,155,079 | 10/1992 | Cribbs et al. | 502/113 |
| 5,461,018 | 10/1995 | Ala-Huikku et al. | 502/115 |
| 5,466,766 | 11/1995 | Patsidis et al. | 526/129 |

FOREIGN PATENT DOCUMENTS 0 457 236 A2   11/1991   European Pat. Off. .

*Primary Examiner*—Deborah Jones
*Attorney, Agent, or Firm*—Ernest G. Posner

[57] ABSTRACT

A process of producing supported olefin polymerization catalysts in which the support is a porous silica material containing specified amounts of alkali and alkaline metal cations, and olefin polymerization catalysts produced thereby.

23 Claims, No Drawings

1

SILICAS WITH SPECIFIC CONTENTS OF CATIONS AS SUPPORTS FOR OLEFIN POLYMERIZATION CATALYSTS

BACKGROUND OF THE INVENTION

1. Field of the Invention

This invention relates to a process of producing olefin polymerization catalysts and catalysts produced thereby, and more particularly, the invention relates to a process of producing supported olefin polymerization catalysts in which the support is a porous silica material containing specified amounts of selected alkali and alkaline metal cations, and olefin polymerization catalysts produced thereby.

2. Reported Developments

It is well-known in the prior art that olefins can be polymerized alone to produce homopolymers, interpolymers and copolymers at relatively low pressures and temperatures by using Ziegler-Natta catalysts which have been know since the 1950's. The Ziegler-Natta catalyst may be broadly described as consisting of combinations of strong reducing agents, such as the organometallic compounds of an alkali metal or alkaline earth metal, in combination with various reducible heavy metal compounds, such as the halides and alkoxides of the metals groups IVB, VB, VIIB and VIII of the Periodic Table. The catalytic activity of these catalysts are relatively low. Since the Ziegler-Natta discovery, numerous catalysts have been disclosed as improvements over the original Ziegler-Natta catalysts for use in olefin polymerization.

It is also known to form silica-supported catalysts by depositing reagents of Ziegler-Natta catalysts upon silica particles, for example: U.S. Pat. No. 2,981,725, which discloses magnesium chloride, silicone carbide, silica gel, calcium chloride and the like as inert support for the catalysts; and U.S. Pat. No. 3,787,384, which discloses catalyst synthesis by reaction of silica with an organomagnesium compound and subsequent treatment of the product with titanium tetrachloride. The particulate catalyst that is obtained in U.S. Pat. No. 3,787,384 is activated with an aluminum alkyl co-catalyst.

U.S. Pat. No. 3,784,539 discloses a similar use of silica in catalyst synthesis, however, the silica particles are first modified by reaction with an organoaluminum compound, and the transition metal used is vanadium.

In these patents the porous silica is preferably heated to remove surface water and at least some of the surface hydoxyl groups prior to the Synthesis of the catalysts. In the specifications of these patents there is no disclosure relating to the modification of silicas with cations.

Other patents relating to the chemical modification of silica for catalyst synthesis include U.S. Pat. Nos. 4,530,912, 4,530,913 and 4,565,795. The modifications disclosed are carried out by reaction of the porous silica with multifunctional or monofunctional organic silicon compounds, chlorinating compounds and organoboron compounds. One important purpose of modifying the silica is to regulate molecular weight and molecular weight distribution of the polymers obtained. However, although the concept of chemical modification prior to catalyst synthesis is disclosed, the modification of silica with cations is not disclosed or suggested.

Other types of silica-supported Ziegler-Natta catalysts which are known in the prior art include:

a) The multiple site type, for example, the catalysts disclosed in U.S. Pat. No. 5,155,079, which discloses a zirconium compound and a vanadium or titanium compound deposited on silica particles;

b) The metallocene type compounds in which the transition metal compound, a bis (cyclopentadienyl) metallocene, and especially a zirconocene, as disclosed in U.S. Pat. No. 4,701,432, or a monocyclopentadienyl compound of zirconium, hafnium or titanium, as disclosed in U.S. Pat. No. 5,057,475; and c) Catalysts for isotactic polypropylene as in U.S. Pat. No. 4,950,631.

In none of these patents or other publications has there been a disclosure or suggestion of cation modification of porous silica for the purpose of preparing a polymerization catalyst using a modified porous silica support as described in the present invention.

It appears that the reason for the complete absence of disclosures relating to alkali and alkaline earth metal ion modification of silica is the prior art teaching that the presence of such ions in porous silica produces a harmful effect. Before silica-supported Ziegler-Natta catalysts were known, porous silica grades were widely used in thermally activated catalysts. These so-called Phillips catalysts are broadly described in U.S. Pat. No. 2,825,721, in which fixed bed and suspended mobile catalysts for olefin polymerization processes are also described. A suspended catalyst slurry polymerization process often designated the particle form process as the most efficient and widely used process for olefin polymerization. A preferred silica-based catalyst type for the particle form process is a chromium catalyst on silica having an average pore diameter of from 300° to about 600 Å, which is activated at temperatures of 500° C. and higher. However, it is believed that if the silica contains sodium and other alkaline ions, the pore structure of the silica tends to collapse at temperatures above 800° C. Thus, in U.S. Pat. No. 3,960,826, there is disclosed an alkali silicate, which must be washed with a liquid before drying in order to reduce the concentration of alkaline material in the hydrogel in order to avoid collapse of the pores in the silica. The washing is to be continued until the concentration of alkali ions in the separated liquid is less than 20 ppm. Another procedure for the preparation of a large volume catalyst is disclosed in U.S. Pat. No. 4,299,731 according to which the aged hydrogel is washed with water until the alkali metal content is less than about 0.1 weight percent. Still another patent relating to the elimination of alkali metal from porous silica is U.S. Pat. No. 4,791,089, which describes synthesis of silicas containing a small amount of zirconium. The process disclosed includes washing to remove alkali metal ions in order to eliminate weak catalyst supports and collapse of pores.

From the cited references it is clear that the presence of alkali metal ions in silica is believed to be undesirable.

Contrary to the teaching of the prior art, it was surprisingly discovered that catalysts can be prepared using porous silica materials by replacement of a portion of the surface hydroxyl groups on the porous silica with alkali and alkaline earth metal ions which porous silica can be used as support in a catalyst for olefin polymerization, and specifically for the control of molecular weight and molecular weight distribution in olefin polymerization.

SUMMARY OF THE INVENTION

It is an object of the present invention to provide silica-supported olefin polymerization catalysts by which molecular weight and molecular weight distribution of the olefin during the polymerization process can be controlled.

The catalysts of the present invention comprise porous silica materials prepared by replacement of a portion of the surface hydroxyl groups on the porous silica materials with alkali and alkaline earth metal ions. The metal ions included are those of groups IA and IIA of the Periodic Table of the Elements (corresponding to Groups 1 and 2 in IUPAC form of the Table.) For economy and safety reasons the ions of lithium, sodium, potassium, magnesium and calcium are preferred. The control of molecular weight characteristics is achieved primarily through the ratio of the cation quantity to the number of surface hydroxyl groups of the silica.

It is well known that surface hydroxyl groups exist as separate, isolated hydroxyls and as hydrogen-bonded species. It is also known that the chemical reactivity of these two types of hydroxyl groups differ significantly. For example, most silylating reagents readily react with the free hydroxyl groups and not with the hydrogen-bonded groups. Studies of silica by infrared spectroscopy have shown that the free hydroxyl groups amount to about 25 to 50% of the total hydroxyl content. When cations are introduced onto the silica surface, they will be bonded first predominantly at the more acidic silanol groups until the more acidic silanols are completely converted to $SiO^-$ anions bonded to cations. The singly-bonded, non-hydrogen groups are believed to be more acidic and will preferentially react with basic cations. Consequently, if an amount of cation equivalent to the isolated hydroxyl groups is added to a silica support, only hydrogen-bonded surface hydroxyl groups will remain on the silica support. Catalyst groups with this silica support will provide a relatively narrow molecular weight distribution polyolefin. If a smaller amount of cation is added, both types of hydroxyl will remain on the porous silica, and the catalyst will yield polyolefins of broader molecular weight distribution.

Another object of the present invention is to provide silica-supported Ziegler-Natta olefin polymerization catalysts by which the polyolefins produced will have different molecular weight distributions depending upon the cation content of the silica support. The Ziegler-Natta catalysts may be of magnesium-titanium type, vanadium type, multisite type and metallocene type. Reactivity, molecular weights and molecular weight distribution will be strongly affected by the transition metal compounds, but the control of the cation content will be effective within each particular type of catalyst.

A further object of the present invention is to provide catalysts suitable for the preparation of isotactic polypropylene.

Still another object of the present invention is to provide cation-containing silica supports for thermally-activated catalysts. In the process of achieving this object, the temperature of activation can be kept below the temperature at which pores collapse and surface area decreases by selecting a cation to minimize or eliminate these effects.

DETAILED DESCRIPTION OF THE INVENTION

The surprising aspect of the present invention is the discovery that cation-modified silicas may be used as supports for several types of silica-supported Ziegler-Natta catalysts. In general, any type of Ziegler-Natta catalyst known in the art can be used. The process of attaching Ziegler-Natta catalysts to a solid, porous support is also well-known. The process results in a dried silica gel which consists of the Ziegler-Natta catalyst attached to the solid, porous silica support. Ziegler-Natta catalysts and the process of attaching them to solid support materials are disclosed, for example, in the patents cited under the Reported Developments section of this disclosure, which are incorporated herein by reference.

The preparation of the solid, porous support of the present invention will now be described.

The Porous Silica

The porous silicas suitable for the practice of the present invention have surface areas of from about 200 to about 700 $m^2/g$, and pore volumes of from about 1 to about 4 ml/g. While the particle size is not critical, it is preferred to use a particle size in the range of from about 20 to 200 micrometers measured in average diameter. The shape of the porous silica may be spherical or granular in which shapes porous silicas are commercially available. The total surface hydroxyl content of commercially available porous silicas is normally about 2.5 millimoles per gram of silica which has a surface area of about 300 $m^2/g$. In general, the hydroxyl content of the porous silica, before drying or other treatment, is about 5 OH groups per square nanometer. Depending upon the method of preparation the singly-bonded, i.e., non-hydrogen bonded, silanol content is about 1.25 to 2.5 per $nm^2$, and more often about 1.7 per $nm^2$.

Cations and Processes of Their Bonding to Silica

The present invention contemplates the following processes for depositing/bonding cations to silica. However, other processes embodying the inventive concept may also be used as will be apparent to those skilled in the art.

(a) Sodium, potassium and lithium ions can be bonded to the silica by contacting water solutions of their hydroxides with a quantity of porous silica. The pH of the hydroxide solutions must be less than about 10.5, preferably, the pH should be in the range of about 8 to 10. The temperature of the operation and the concentration of the hydroxides must be chosen so that the silica porosity is not adversely affected. It was found that a contact time of about 30 minutes at about 20° C. is adequate for sodium hydroxide solutions having a concentration of from about 0.001 to about 0.025 M to deposit sufficient amounts of cations onto the porous silica. After the contact time has elapsed, the silica is separated and rinsed with a volume of water equal to the volume of the sodium hydroxide solution. Subsequent to rinsing, the water remaining in the cation-modified silica is displaced with an organic solvent, such as acetone, methanol, ethanol or propanol, and dried. After drying, in order to remove the organic solvent as much as possible, the cation-modified silica may be purged with nitrogen as the final step prior to the Ziegler-Natta catalyst synthesis.

The alkaline earth cations, such as calcium or magnesium, may also be directly deposited onto the porous silica from an aqueous solution using the same procedure as described for the alkali metals.

An especially preferred way to incorporate alkali metal ions and alkaline earth metal ions into silica is at the end of the silica gel preparation process but before the final drying step.

After the silica hydrogel has been formed and the concentration of free and hydrogen-bonded surface hydroxyl groups is determined, the required amount of metal hydroxide to displace the desired portion of hydroxyl groups is added to the wet hydrogel. It is important, however, to maintain the concentration of the base low enough so as not to begin the dissolution of the hydrogel. After the addition of the alkali metal ions or the alkaline earth metal ions, the hydrogel may be washed with water and dried. Drying can be carried out, for example, by azeotropic distillation with ethyl acetate; by water extraction with a water-miscible liquid, such as acetone; or, if very large pore size is not required, simply by heating.

(b) An alternative procedure to that above-described is used when the silica, in a hydrogel form free of sodium ions, is treated with $NH_4OH$ to bring the pH to between 7 and 10 and then ion exchanged with a salt of the alkali and alkaline earth metals.

In the process of incorporating sodium ions into silica, the preferred method is to limit the washing steps in the preparation of the silica hydrogel from sodium silicate so that the desired ratio of sodium ions to hydroxyl groups remains.

Preferred Ranges of Cations Deposited on Silica

Preferred ranges of cations deposited on silica are as shown:

| Surface Area of Silica | Millimoles of Cation |
|---|---|
| 200 m²/g | 0.05 to 0.83/g |
| 300 m²/g | 0.05 to 1.24/g |
| 400 m²/g | 0.05 to 1.66/g |

The above-stated values are based on silica containing a surface concentration of 5.0 hydroxyl groups per square nanometer, with about 2.5 hydroxyl groups belonging to the stronger acid group. The upper limit of cation content is determined in practice by the actual surface concentration of the stronger acid type of the silanol groups.

Modification of the hydroxyl content by sodium ions is one of the preferred embodiments. As mentioned earlier, such modification using sodium ions can be accomplished by control of the washing steps in the silica hydrogel preparation. Regulation of the molecular weight and molecular weight distribution of polyolefins is more efficient and more flexible in this embodiment of the present invention.

As stated above, the cation-modified silicas of this invention may be used as supports for several types of silica-supported Ziegler-Natta catalysts. The Ziegler-Natta catalytic materials may be reacted with silica. Most any type of catalysts known in the art can be attached to the cation-modified silicas of the present invention. However, in order to take full advantage of molecular weight tailoring capabilities of this invention, there are preferred limits to the loading of Ziegler-Natta reagents upon the silica. Thus, for catalysts made with organomagnesium reagents and titanium tetrachloride, the organomagnesium compound should not be added in mounts of more than 2.5 mmols/g of silica having a surface area of about 300 m²/g. The same limit applies to titanium tetrachloride and vanadium catalysts. In the preparation of the so-called multisite catalysts, the total amount of transition metal compounds expressed in millimoles should not exceed the sum of the millimoles of hydroxyl groups and cations on the silica support.

In the preparation of the metallocene type of catalysts it may be desired to add methylaluminoxane to the cation-modified silica. The preferred upper limit of the metallocene catalyst to the amount of methylaluminoxane is calculated from the actual average molecular weight of the methylaluminoxane and not from the ratio of contained Al to hydroxyl and cation groups. The amount of metallocene to be added lies within an Al/metallocene ratio range of from about 1.0/1 to about 200/1. It is to be noted, however, that in this embodiment of the invention the amount of metallocene employed with the cation-modified silica must be an amount that is bonded to the silica catalyst.

The catalysts of the present invention may be used in gas or slurry phase processes, both processes being known by those skilled in the art of polymerizing olefins. The polymerization may be conducted at a temperature in the range of from about 0° to 160° C. or higher and under atmospheric, subatmospheric or superatmospheric conditions.

In a slurry polymerization a suspension of solid, particulate polymer is formed in a liquid polymerization medium containing a monomer or monomers, to which hydrogen and a catalyst are added. Solvents used in the polymerization medium include ethylene, propylene, butadiene, cyclopentane and the like.

Gas-phase polymerization process utilizes superatmospheric pressures and temperature range of about 50° C. to 110° C. The polymerization is performed in a stirred or fluidized bed of catalyst and product particles in a pressure vessel. Monomers, hydrogen and an inert diluent gas, such as nitrogen is introduced into the vessel while maintaining the required temperature range. The formed polymer can be withdrawn continuously. The polymer obtained can be extruded into water and cut into the desired shapes.

The following examples will further illustrate the present invention.

EXAMPLE 1 (PRESENT INVENTION)

(A) High Sodium Silica Synthesis 45 grams of Hydrogel (hydrated microspherical silica) having a pore volume of 3.0 cc/g and a surface area of 300 m²/g was slurried in 600 ml of slightly acidic water (pH of about 3.3) until the slurry became homogeneous. The slurry was titrated with 3% w/w aqueous $NH_3$ while stirring (over 5 minutes) until the pH of 7.6 was reached. Then 1.0 gram of anhydrous $Na_2SO_4$ was added to the slurry as a result of which the pH dropped to 7.2. The slurry was then stirred for 24 hours, filtered, and the filtrate was washed with 5×500 ml of deionized water, followed by washing with 5×500 ml of methanol. The filtrate was then dried at 180° C. overnight. The surface area of the particles was 288 m²/g and the pore volume was 2.84 ml/g.

(B) Catalyst Synthesis

All the steps were performed under dry nitrogen atmosphere.

5.0 grains of the high sodium silica made in Example 1(A) (calcined under nitrogen at 300° C. for five hours) was slurried in 25 ml of heptane, using as container, a 250 ml 3-neck round bottom flask equipped with paddle stirrer. Next, 9.3 ml of butylethylmagnesium in heptane (0.67 mmol/ml) was added to the silica/heptane slurry and stirred for one hour. Then, 2.5 ml of $TiCl_4$ in heptane (2.52 mmol/ml) was added to the flask and the content was stirred for one hour. The flask then was placed in an oil bath heated to 100° C. and all the solvents were removed from the slurry mixture under nitrogen purge. Catalyst yield was 6.5 grams of a dark brown, free-flowing powder.

EXAMPLE 2 (COMPARATIVE EXAMPLE)

Catalyst Synthesis 5.0 grams of a high pore volume (3.0 cc/g) microspherical silica gel having a surface area of 300 m²/g was slurried in 25 ml of heptane, using as container, a 250 ml 3-neck round bottom flask equipped with paddle stirrer. Next, 9.3 ml of butylethylmagnesium in heptane (0.67 mmol/ml) was added to the silica/heptane slurry and stirred for one hour. Then, 0.696 ml of $TiCl_4$ was added to the flask and the content was stirred for one hour. The flask then was placed in an oil bath heated to 95° C. and all the solvents were removed from the slurry mixture under nitrogen purge. Catalyst yield was 6.2 grams of a dark brown, free-flowing powder.

EXAMPLE 3 (COMPARATIVE EXAMPLE)

(A) Low Sodium Silica Synthesis 45 grams of Hydrogel (microspherical silica) was slurried in 600 ml of acidified water (pH of about 3.3). The slurry was titrated with 3% w/w aqueous $NH_3$ while stirring (over 5 minutes) until the pH of 7.6 was reached. The slurry was then stirred for 24 hours, filtered, washed with 5×500 ml of deionized water, followed by washing with 5×500 ml of methanol. The filtrate was then dried at 180° C. overnight. The surface area of the sodium treated silica particles was 288 $m^2$/g and the pore volume was 3 ml/g.

(B) Catalyst Synthesis 5.0 grams of the low sodium silica made in Comparative Example 3(A) (calcined under nitrogen at 300° C. for five hours) was slurried in 25 ml of heptane, using as container, a 250 ml 3-neck round bottom flask equipped with paddle stirrer. Next, 9.3 ml of butylethylmagnesium in heptane (0.67 mmol/ml) was added to the silica/heptane slurry and stirred for one hour. Then, 0.696 ml of $TiCl_4$ was added to the flask and the content was stirred for one hour. The flask then was placed in an oil bath heated to 95° C. and all the solvents were removed from the slurry mixture under nitrogen purge. Catalyst yield was 6.3 grams of a dark brown, free-flowing powder.

EXAMPLE 4

Catalysts Activity in Polymerization Process

The catalysts synthesized in Examples 1–3 were used in the following polymerization process in order to determine their activity. The process used was the same for each polymerization.

A solution of 150 ml of heptane and 1.0 ml of a 25% w/w TEAL/heptane was charged into a 500 ml Fisher-Porter bottle under nitrogen. The solution was purged with ethylene for ten minutes, then 10 to 20 mg of the catalyst was added. The bottle was placed in an oil bath heated to 70° C. and ethylene fed continuously on demand to the polymerization reaction mixture at 5 psig. After one hour the reaction was stopped and the content of the bottle was transferred into a drying tray to allow formation of a polymer. All solvents were removed from the polymer in a fume hood. $Na_2O$ level, hydroxyl content and activity were measured and are shown in Table I.

TABLE I

| Example | $Na_2O$ Level (ppm) | Hydroxyl Content (mmol/g) | Activity (g/g cat) |
| --- | --- | --- | --- |
| 1 | 1150 | 0.90 | 73 |
| 2 | 228 | 1.45 | 29 |
| 3 | 250 | 1.26 | 44 |

Having described the invention with reference to its preferred embodiments, it is to be understood that modifications within the scope of the invention will be apparent to those skilled in the art.

What is claimed is:

1. A process of making a silica-supported olefin polymerization catalyst component comprising the steps of:
   (a) contacting porous silica having surface hydroxyl groups thereon with an aqueous solution of sodium, potassium, lithium, calcium or magnesium hydroxide at a pH of less than 10.5;
   (b) separating the porous silica from the aqueous solution;
   (c) washing the separated porous silica with water;
   (d) displacing residual water in the porous silica with an organic solvent;
   (e) drying the porous silica; and
   (f) purging residual organic solvent from the porous silica with nitrogen.

2. The process of claim 1 wherein said pH of said aqueous hydroxide solution is of from about 8 to about 10.

3. The process of claim 1 wherein the contact time of said aqueous hydroxide solution and said porous silica is about 30 minutes when the concentration of said aqueous hydroxide solution is of from about 0.001 to about 0.025 M.

4. A process of making a silica-supported olefin polymerization catalyst component comprising the steps of:
   (a) treating silica hydrogel having surface hydroxyl groups thereon and being free of sodium ions with $NH_4OH$ to bring the pH to greater than 7 but less than 10;
   (b)) treating said silica with an aqueous solution comprising a salt of an alkali metal or alkaline earth metal;
   (c) separating said silica from the aqueous solution;
   (d) washing the separated silica with water;
   (e) displacing residual water in the silica with an organic solvent;
   (f) drying the silica; and
   (g) purging residual organic solvent from the silica with nitrogen.

5. The process of claim 4 wherein said pH of said aqueous solution is of from about 8 to about 10.

6. A process of making a silica-supported Ziegler-Natta olefin polymerization catalyst comprising the steps of:
   (a) contacting porous silica having surface hydroxyl groups thereon with an aqueous solution of sodium, potassium, lithium, calcium or magnesium hydroxide at a pH of less than 10.5;
   (b) separating the porous silica from the aqueous solution;
   (c) washing the separated porous silica with water;
   (d) displacing residual water in the porous silica with an organic solvent;
   (e) drying the porous silica;
   (f) purging residual organic solvent from the porous silica with nitrogen; and
   (g) reacting the porous silica with a Ziegler-Natta catalytic material.

7. The process of claim 6 wherein said porous silica has a surface area of from about 200 to about 700 $m^2$/g and a pore volume of from about 1 to about 4 ml/g.

8. The process of claim 6 wherein said porous silica is spherical or granular.

9. The process of claim 2 wherein said porous silica has a surface area of from about 200 to about 400 $m^2$/g.

10. The process of claim 9 wherein said porous silica is treated with from about 0.05 to about 1.66 millimoles of a metal ion per gram of silica.

11. The process of claim 6 wherein said pH of said aqueous hydroxide solution is of from about 8 to about 10.

12. The process of claim 6 wherein the contact time of said aqueous hydroxide solution and said porous silica is about 30 minutes when the concentration of said aqueous hydroxide solution is of from about 0.001 to about 0.025 M.

13. A process of making a silica-supported Ziegler-Natta olefin polymerization catalyst comprising the steps of:
   (a) treating silica hydrogel having surface hydroxyl groups thereon and being free of sodium ions with $NH_4OH$ to bring the pH to greater than 7 but less than 10;

(b) treating the silica with an aqueous solution comprising a salt of an alkali metal or alkaline earth metal;

(c) separating the silica from the aqueous solution;

(d) washing the separated silica with water;

(e) displacing residual water in the silica with an organic solvent;

(f) drying the silica;

(g) purging residual organic solvent from the silica with nitrogen; and (h) reacting the porous silica with a Ziegler-Natta catalytic material.

14. The process of claim 13 wherein said porous silica has a surface area of from about 200 to about 700 $m^2/g$ and a pore volume of from about 1 to about 4 ml/g.

15. The process of claim 13 wherein said silica is spherical or granular.

16. The process of claim 14 wherein said silica has a surface area of from about 200 to about 400 $m^2/g$.

17. The process of claim 16 wherein said silica is treated with from about 0.05 to about 1.66 g of a metal ion.

18. The process of claim 13 wherein, said pH of said aqueous $NH_4OH$ solution is of from about 8 to about 10.

19. The process of claim 13 wherein the contact time of said aqueous solution and said silica is about 30 minutes when the concentration of said aqueous $NH_4OH$ solution is of from about 0.001 to about 0.025 M.

20. A process of making a silica-supported Ziegler-Natta olefin polymerization catalyst comprising the steps of:

(a) contacting porous silica having surface hydroxyl groups thereon with an aqueous solution of sodium, potassium, lithium, calcium or magnesium hydroxide at a pH of less than 10.5;

(b) separating the porous silica from the aqueous solution;

(c) washing the separated porous silica with water and separating the porous silica;

(d) displacing residual water in the porous silica with an organic solvent;

(e) drying the porous silica;

(f) purging residual organic solvent from the porous silica with nitrogen; and (g) reacting the porous silica with a Ziegler-Natta catalytic metal salt wherein said catalytic metal is selected from the group consisting of titanium, vanadium and zirconium.

21. The process of claim 20 wherein said Ziegler-Natta catalytic metal salt is chloride.

22. A process of making a silica-supported Ziegler-Natta olefin polymerization catalyst comprising the steps of:

(a) contacting porous silica having surface hydroxyl groups thereon with an aqueous solution of sodium, potassium, lithium, calcium or magnesium hydroxide at a pH of less than 10.5;

(b) separating the porous silica from the aqueous solution;

(c) washing the separated porous silica with water;

(d) displacing residual water in the porous silica with an organic solvent;

(e) drying the porous silica;

(f) purging residual organic solvent from the porous silica with nitrogen; and (g) reacting the porous silica with a metallocene of a Ziegler-Natta catalytic metal, wherein said Ziegler-Natta catalytic metal is selected from the group consisting of titanium, vanadium and zirconium.

23. The process of claim 22 wherein said metallocene is dicyclopentadienyl titanium chloride.

* * * * *